(12) United States Patent
Jackson

(10) Patent No.: US 11,659,815 B2
(45) Date of Patent: May 30, 2023

(54) PET TOY

(71) Applicant: Doskocil Manufacturing Company, Inc., Arlington, TX (US)

(72) Inventor: Jill Jackson, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 32 days.

(21) Appl. No.: 17/038,966

(22) Filed: Sep. 30, 2020

(65) Prior Publication Data

US 2021/0235668 A1 Aug. 5, 2021

Related U.S. Application Data

(60) Provisional application No. 62/968,514, filed on Jan. 31, 2020.

(51) Int. Cl.
*A01K 15/02* (2006.01)

(52) U.S. Cl.
CPC .................. *A01K 15/026* (2013.01)

(58) Field of Classification Search
CPC ... A01K 15/026; A01K 15/025; A01K 5/0014
See application file for complete search history.

(56) References Cited

U.S. PATENT DOCUMENTS

| | | | | |
|---|---|---|---|---|
| 6,073,581 A * | 6/2000 | Wang | .................. | A01K 5/0114 119/51.01 |
| 8,573,159 B1 * | 11/2013 | Crotty | .................. | A01K 15/025 119/707 |
| 9,288,969 B2 * | 3/2016 | Christianson | ........ | A01K 15/025 |
| 10,524,453 B2 * | 1/2020 | Stone | ................... | A01K 15/025 |
| 2007/0289553 A1 * | 12/2007 | Jager | .................... | A01K 15/026 119/710 |
| 2013/0074780 A1 * | 3/2013 | Wechsler | ............. | A01K 15/026 119/710 |
| 2014/0130750 A1 * | 5/2014 | Valle | .................... | A01K 15/026 119/708 |
| 2014/0230752 A1 * | 8/2014 | Yerton | .................. | A23K 50/42 119/709 |
| 2015/0101546 A1 | 4/2015 | Simon et al. | | |
| 2018/0310527 A1 * | 11/2018 | Yang | .................. | A01K 15/026 |
| 2019/0133082 A1 | 5/2019 | Becattini, Jr. et al. | | |

OTHER PUBLICATIONS

International Search Report and Written Opinion dated Apr. 8, 2021 in corresponding International Patent Application No. PCT/US21/15675, filed Jan. 29, 2021.

* cited by examiner

*Primary Examiner* — Trinh T Nguyen

(74) *Attorney, Agent, or Firm* — Global IP Counselors, LLP

(57) ABSTRACT

A pet toy includes a hollow body defining an interior space with an interior surface and including a first portion having a first diameter, a second portion having a second diameter, a first opening in the first portion, a second opening in the second portion and a separation arm extending from the interior surface in the interior space and being disposed between the first and second openings.

14 Claims, 15 Drawing Sheets

PET TOY

CROSS REFERENCE TO RELATED APPLICATIONS

This application claims priority to U.S. Provisional Patent Application No. 62/968,514 filed on Jan. 31, 2020, which is hereby incorporated herein by reference.

BACKGROUND

Field of the Invention

The present invention relates to a pet toy. In particular, the present invention relates to a pet toy having a hollow interior space to receive animal foodstuff.

Background of the Invention

Conventional pet toys with hollow interior spaces are known. These conventional toys are generally able to receive treats or other articles with which the pet can eat or play. Generally, the pet toy can increase the difficulty in accessing the treat or food, since the treat or food is disposed within the interior of the toy. For example, some pet owners may put peanut butter inside the toy in an attempt to prolong the pet's enjoyment of the toy.

SUMMARY

It has been discovered that an improved pet toy that is capable of receiving animal treats or foodstuff is desired. In view of the state of the known technology, one aspect of the present disclosure is to provide a pet toy comprising a hollow body defining an interior space with an interior surface and including a first portion having a first diameter, a second portion having a second diameter, a first opening in the first portion, a second opening in the second portion and a separation arm extending from the interior surface in the interior space and being disposed between the first and second openings.

Another aspect of the present invention provides a pet toy comprising a hollow body defining an interior space with an interior surface. The hollow body includes a first portion having a first diameter, a second portion having a second diameter that is larger than the first diameter, a first opening in the first portion, a second opening in the second portion, a first separation arm extending from the interior surface in the interior space and being disposed between the first and second openings, and a second separation arm extending from the interior surface in the interior space and being disposed between the first and second openings.

The embodiments of the present invention provide a pet toy that is capable of receiving animal treats or foodstuff. Moreover, due to the structure and configuration of the pet toy, the animal treats or foodstuff can be more difficult to remove from the interior of the pet toy, thus prolonging pet enjoyment and interest.

BRIEF DESCRIPTION OF THE DRAWINGS

Referring now to the attached drawings which form a part of this original disclosure.

DETAILED DESCRIPTION

Figure 1:
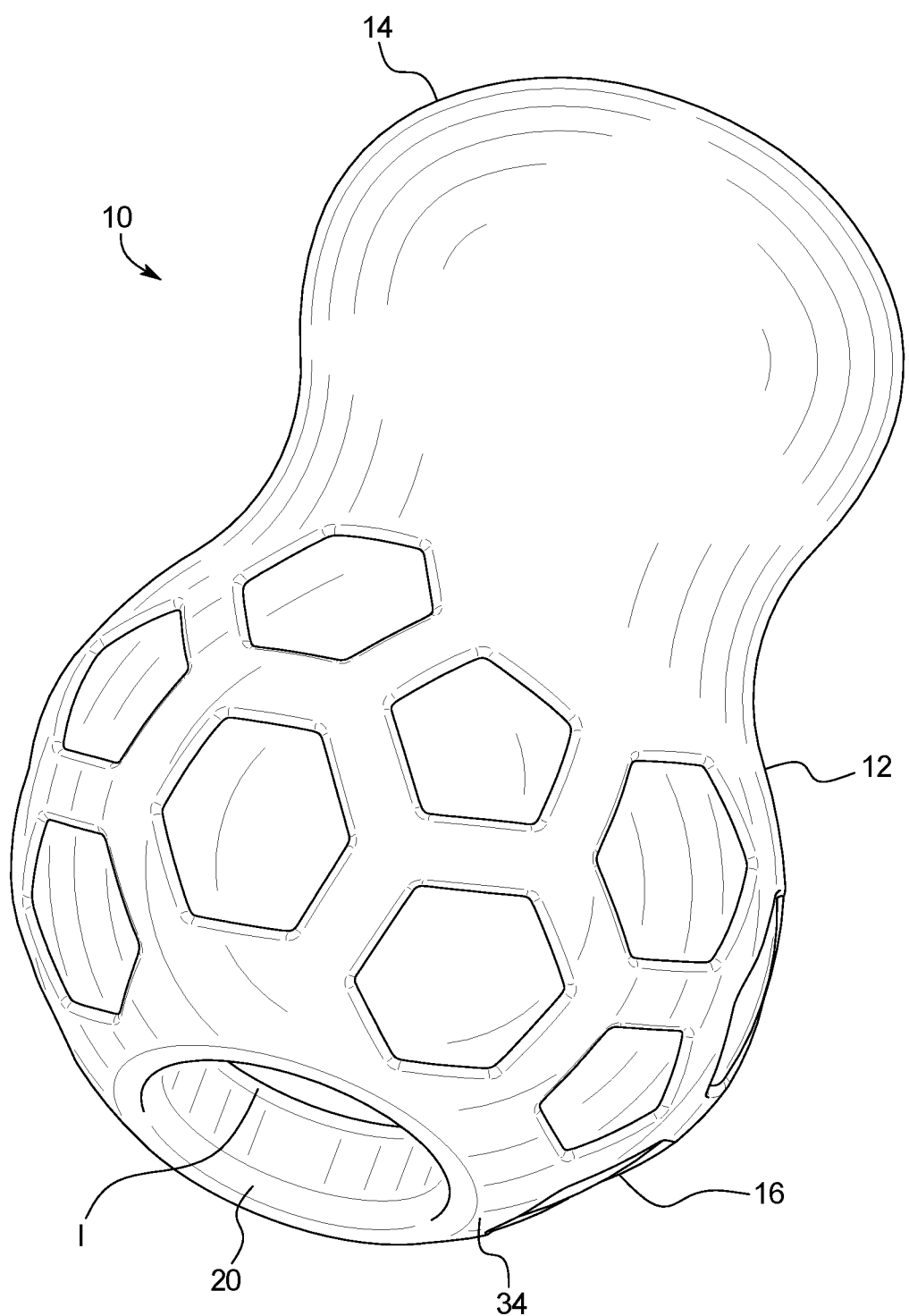
FIG. 1 is a bottom perspective view of a toy according to an embodiment of the present invention.
Figure 2:
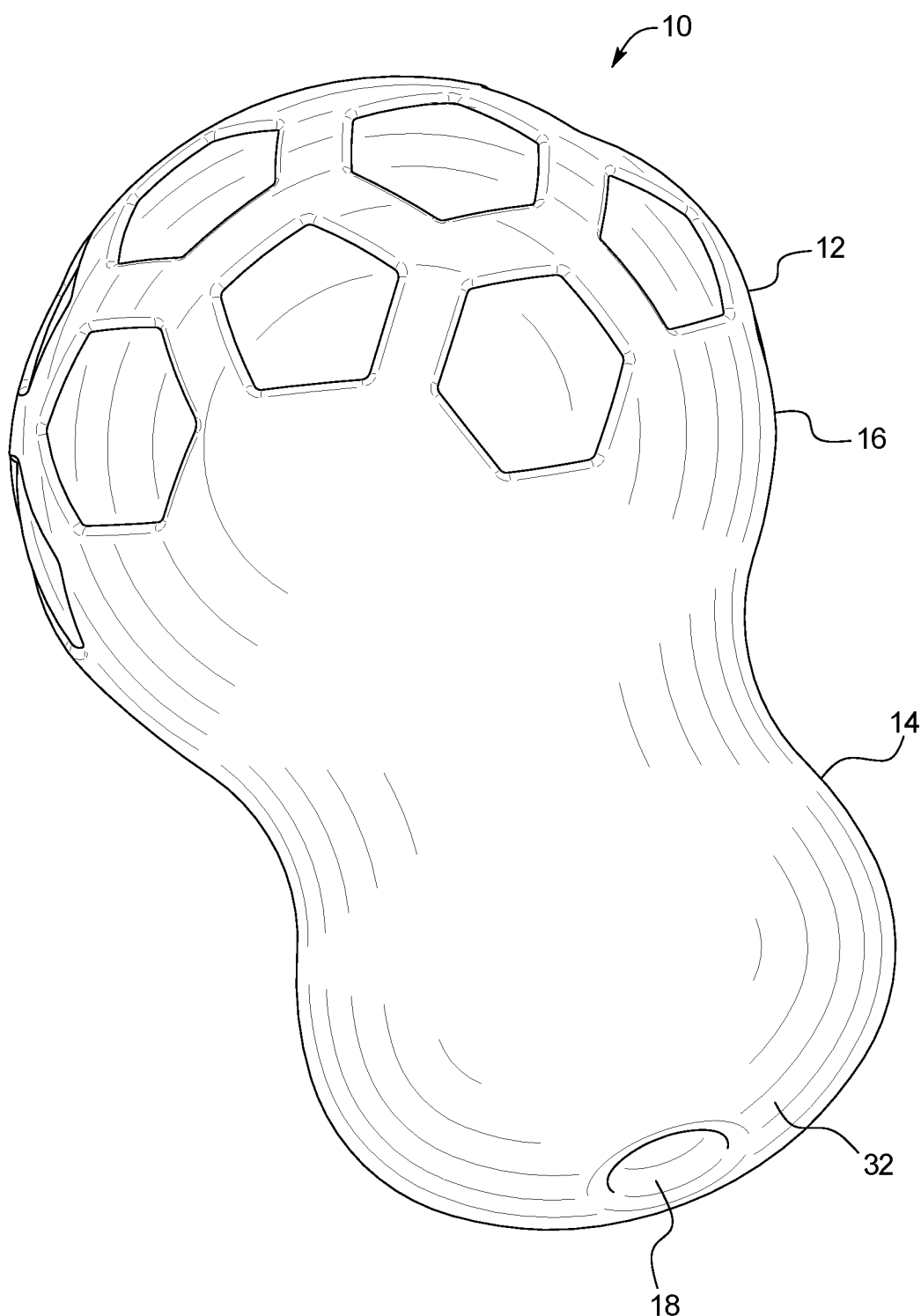
FIG. 2 is a top perspective view of the toy shown in FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-8, a pet toy 10 is illustrated in accordance with a first embodiment. As can be understood the pet toy 10 according to embodiments of the present invention can be formed from portions that have various shapes and sizes and are not necessarily symmetrical. In other words, the pet toy 10 can include a body 12 that has portions (e.g., a first portion 14 and a second portion 16) that have different diameters.

In the embodiment illustrated in FIGS. 1-5, the toy is generally pear shaped with the top or first portion 14, a bottom or second portion 16, a top or first opening 18 and a bottom or second opening 20. However, it is noted that the toy can have any suitable shape, such as peanut, or any other shape desired and have any number of openings desired. Generally, the body 12 can be formed from molded rubber or plastic. Thus, as can be understood, the body 12 can be molded in two parts or halves and joined together using an adhesive or in any other suitable manner. In one embodiment, the two parts can include a first part 22 and a second part 24 that are identical halves, and can be joined together along the longitudinal direction of the body 12. In other embodiments, the pet toy 10 can be unitarily formed as one piece or formed in multiple portions that are joined together. Moreover, the parts 18 and 20 do not need to be identical and can be any number and shape desired.

Figure 6:
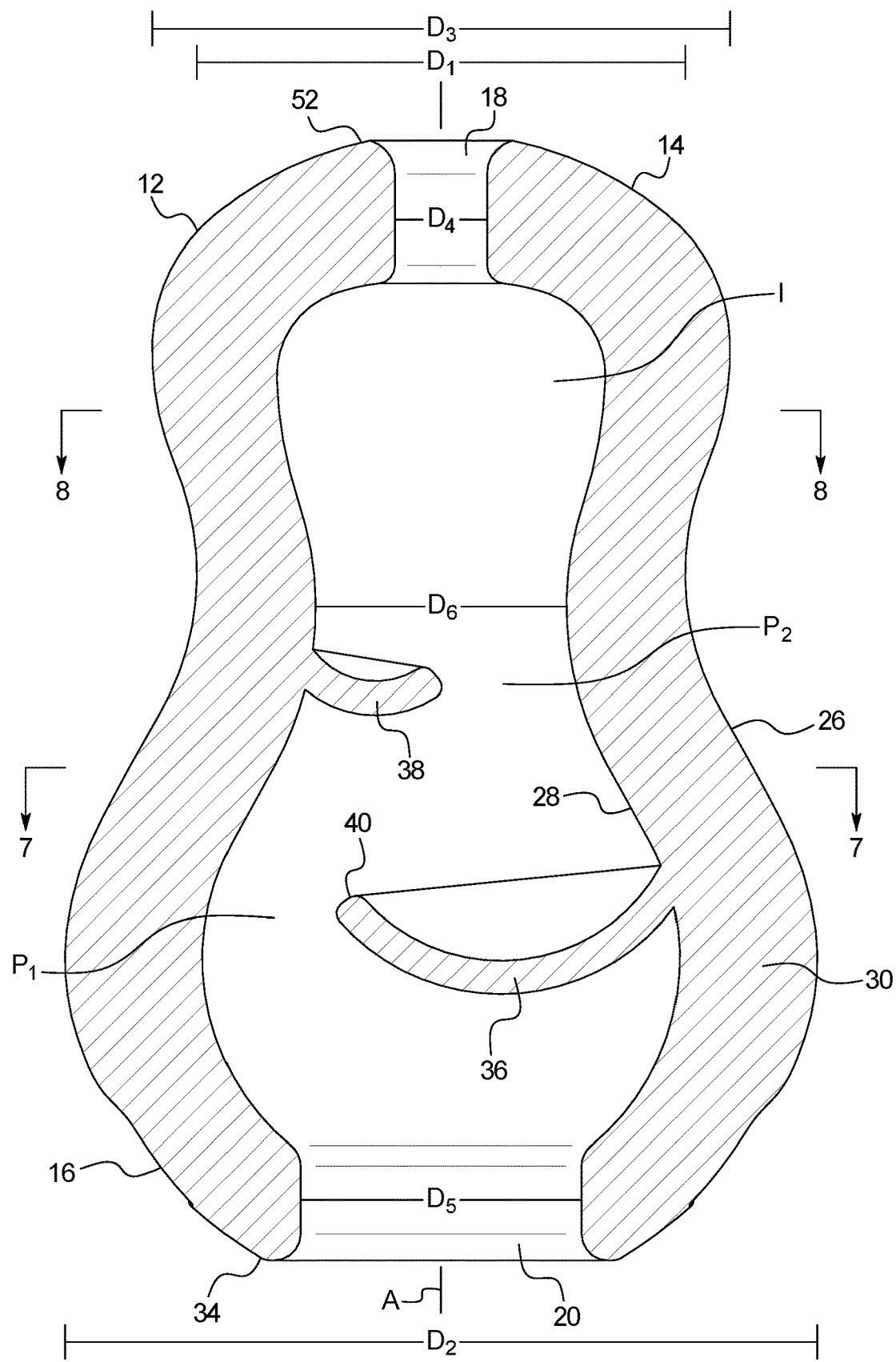
FIG. 6 is a sectional view taken along lines 6-6 in FIG. 4.

In some embodiments, the body 12 of the pet toy 10 can be a hollow body defining an interior space I. Thus, as shown in FIG. 6, the body 12 can have an exterior surface 26 and an interior surface 28 defining the interior space I. A body wall 30 extends between the interior surface 28 and the exterior surface 26. The body wall 30 preferably has a thickness and is made from a material (e.g., rubber or plastic) that prevents an animal from chewing through or piercing the wall 30 to access the interior space I, while simultaneously providing a rubber, softer feel. Further, the body wall 30 can have a varying thickness, if desired. Thus, as shown for example, in FIG. 6, the thickness of the body wall 30 can decrease at or around the second opening 20.

However, it is noted that the thickness of the body 12 wall can be generally or substantially consistent or vary in any manner desired.

In this embodiment, the body 12 includes a first portion 14 having a first diameter $D_1$, a second portion 16 having a second diameter $D_2$. The first and second portions 14 and 16 can be arranged along the longitudinal axis A, and the second diameter $D_2$ can be larger than the first diameter $D_1$. However, it is noted that the diameters can be any size desired. Moreover, there can be multiple diameters depending on the specific size and configuration of the body 12.

Figure 3:
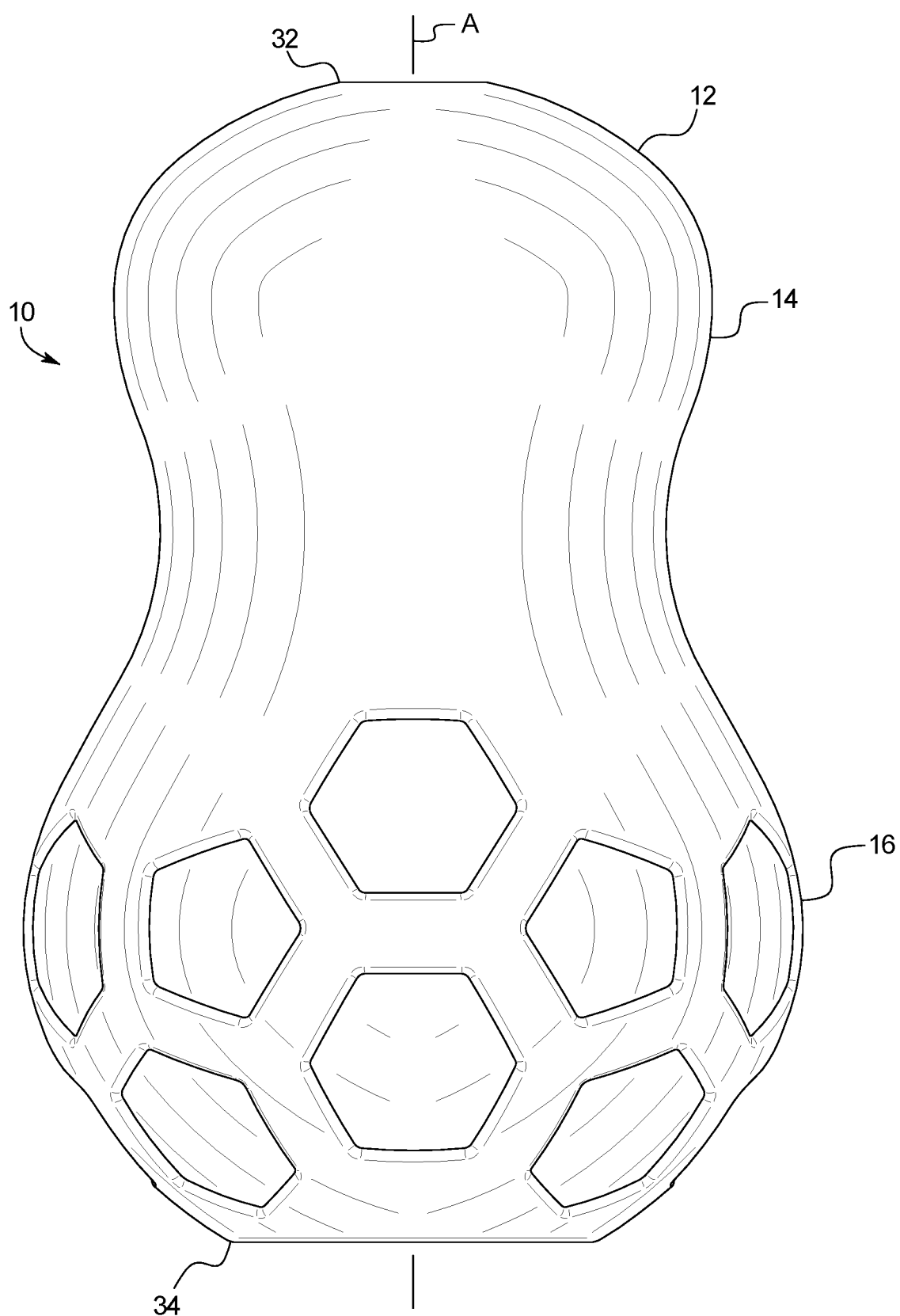
FIG. 3 is a side elevational view of the toy shown in FIG. 1.
Figure 4:
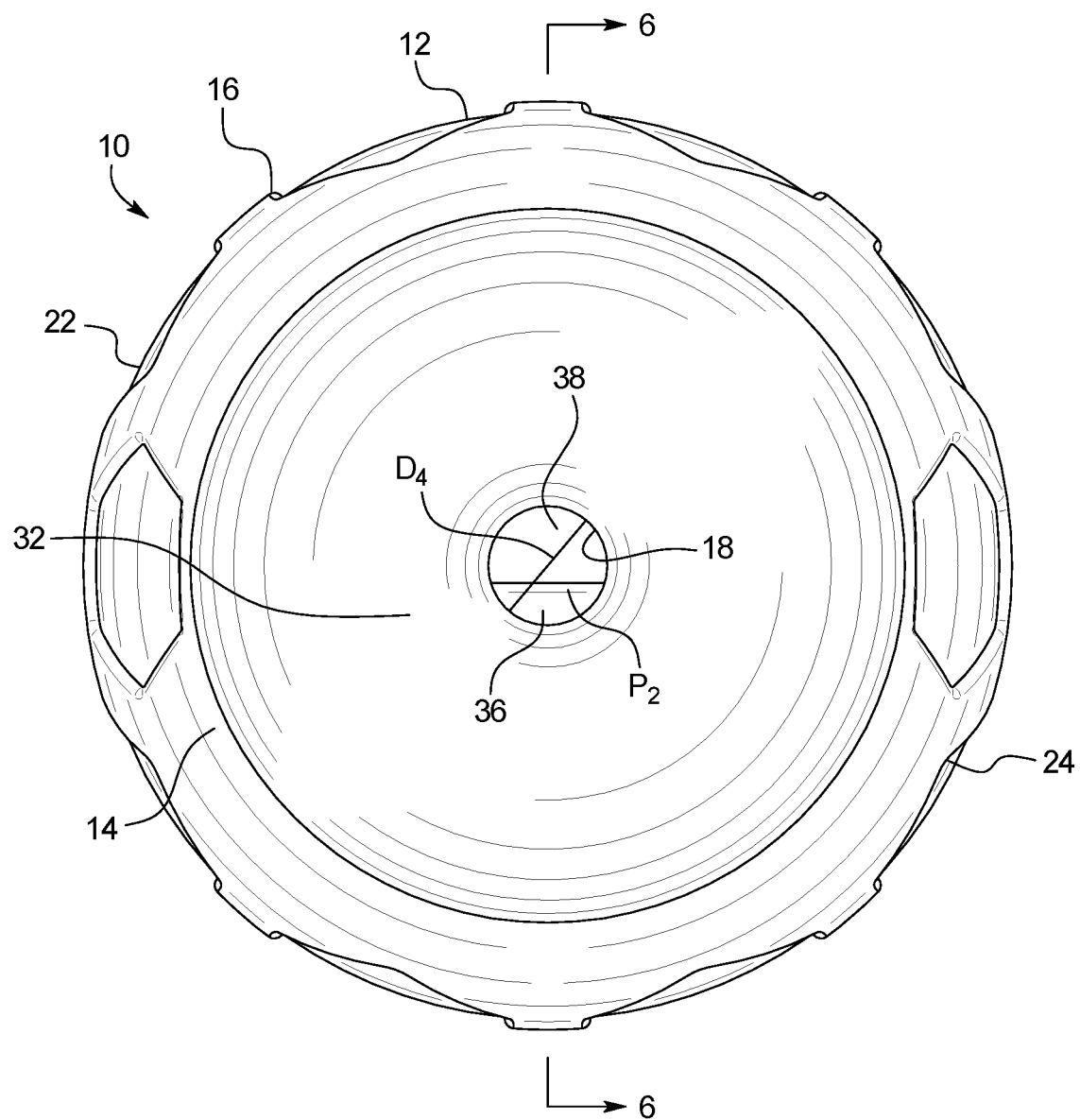
FIG. 4 is a top plan view of the toy shown in FIG. 1.
Figure 5:
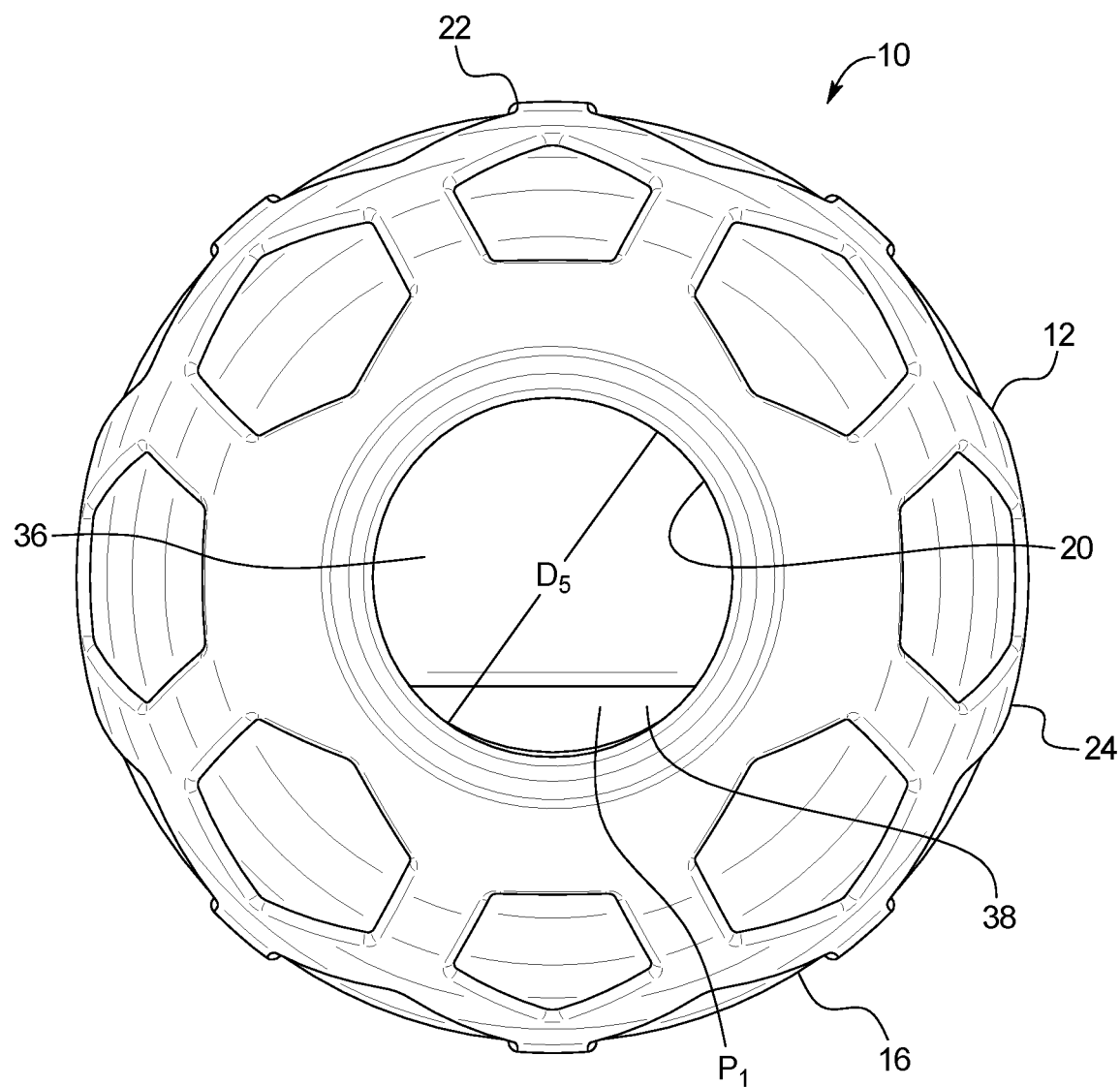
FIG. 5 is a bottom plan view of the toy shown in FIG. 1.

As illustrated in FIGS. 4 and 6, the top portion 14 has an upper surface 32 with the opening 18, and has a generally circular configuration when viewed from above. Moreover, as shown in FIGS. 3 and 6, exterior surface 26 curves downwardly and outwardly to form a maximum diameter portion (e.g., $D_1$) for the top portion 14 and then curves downwardly and inwardly to form a minimum dimeter portion $D_3$ between the top portion 14 and the bottom portion 16. The exterior surface 26 then curves downwardly and outwardly to form a maximum diameter portion (e.g., $D_2$) for the bottom portion 16 and then curves downwardly and inwardly to the bottom surface 34. As shown in FIG. 5, the bottom portion 16 has a generally circular configuration when viewed from below.

The opening 18 in the top surface 32 is a first opening in the first portion 14 and the opening 30 in the bottom surface 34 is second opening is disposed in the second portion 16. The first and second openings 18 and 20 can be generally circular with the centers thereof being about or approximately at the longitudinal axis A of the pet toy 10. Thus, as can be understood, the center of the first and second openings 18 and 20 can be disposed along the longitudinal axis A of the hollow body 12, such that the first and second openings 18 and 20 are coaxial. The openings 18 and 20 are generally disposed to enable treats or other foodstuffs to be inserted into the interior space I of the hollow body 12. Additionally, at least one, if not both, of the openings 18 and 20 are preferably sized and configured to enable a user to insert a finger or other structure into the opening so as to be capable of pulling an object out of the interior space I. In one embodiment, the second opening 20 has a diameter $D_2$ that is larger than the first opening $D_1$. However, it is noted that the first and second openings 18 and 20 can have diameters that are the same size or different sizes in any desired manner. That is, the diameter D4 of the first opening 18 can be the same, smaller or larger than the diameter $D_5$ second opening 20. Furthermore, while in this embodiment, the openings 18 and 20 are illustrated as being generally circular, the openings can be formed in any configuration desired.

The interior portion I can have a separation arm or shelf 36 extending from the interior surface 28 in the interior space I and the separation arm 36 can be disposed between the first and second openings 18 and 20. In one embodiment, the interior space I can include multiple separation arms. For example, the interior space I can include a first separation arm 36 and a second separation 38. The second separation 38, similarly to the first separation arm 36 can extend from the interior surface 28 in the interior space I and is disposed between the first and second openings 18 and 20.

Figure 7:
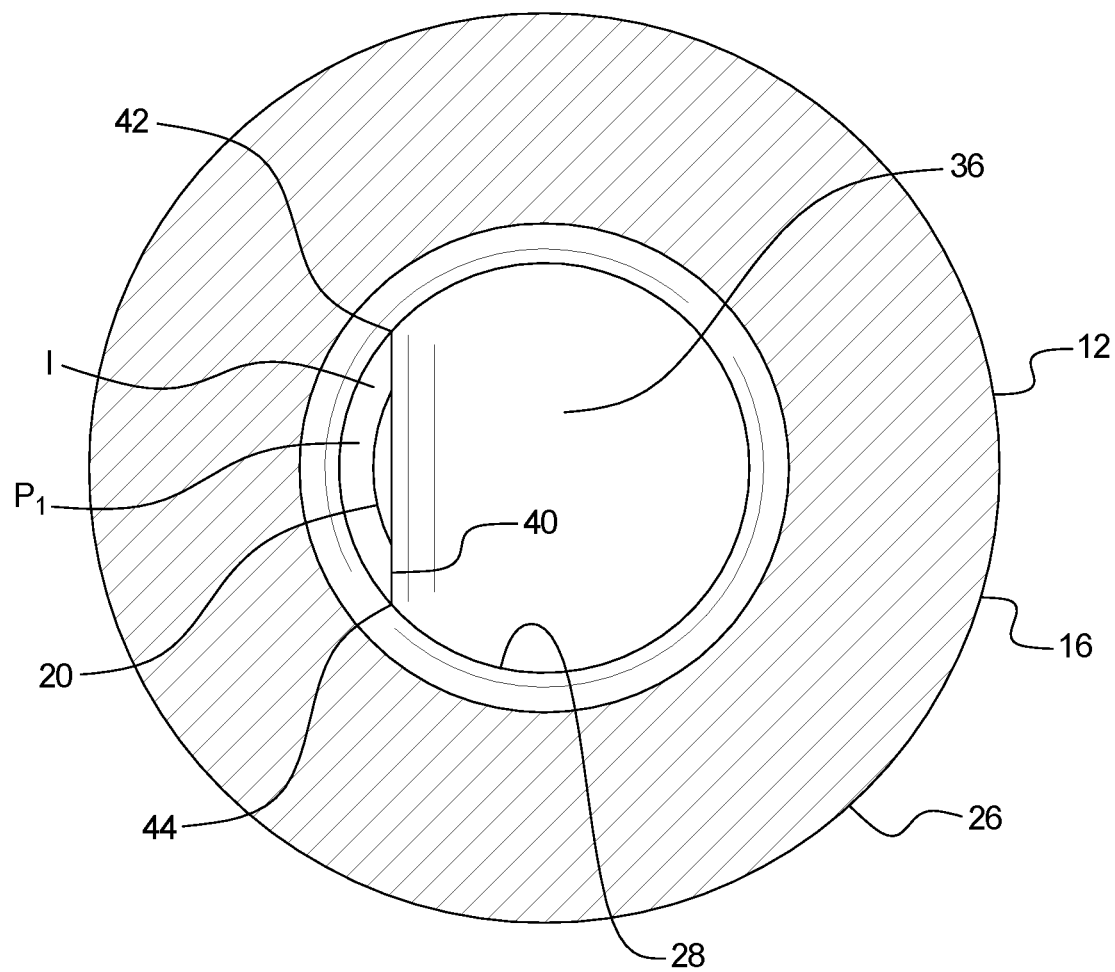
FIG. 7 is a sectional view taken along lines 7-7 in FIG. 6.
Figure 8:
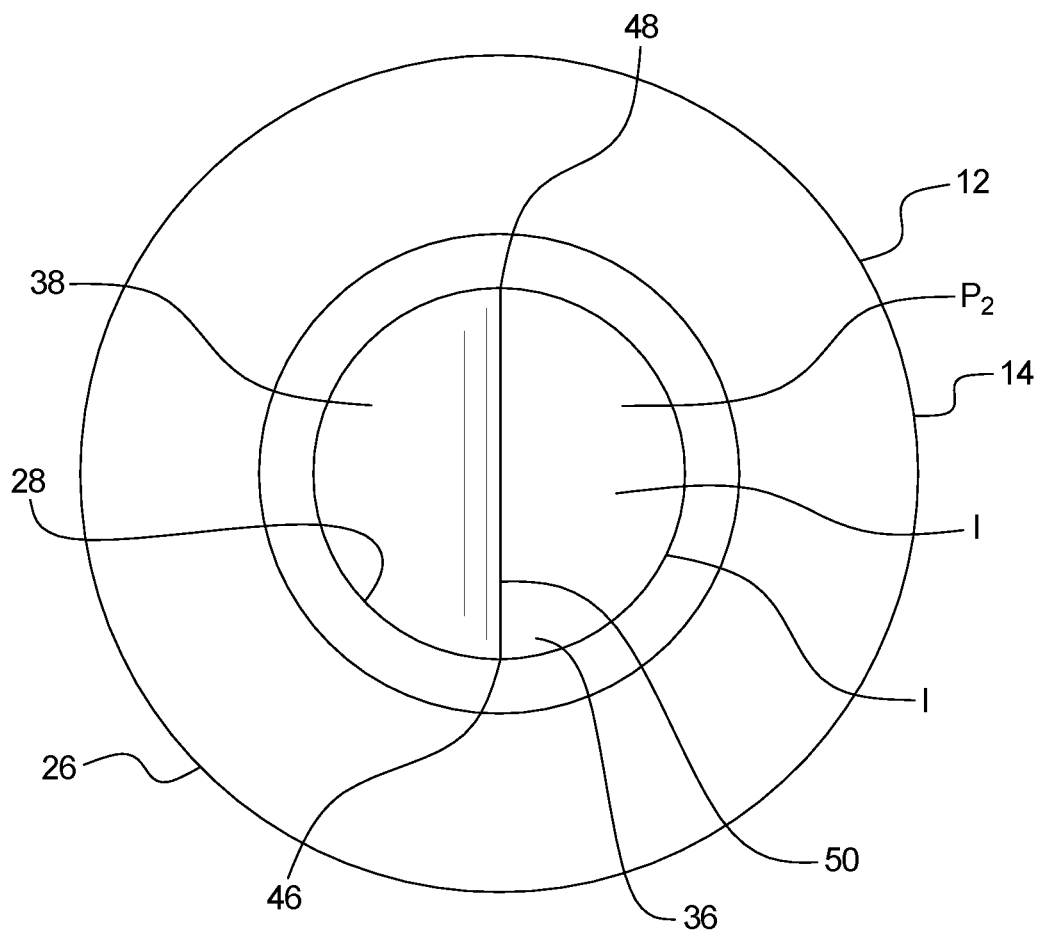
FIG. 8 is a sectional view taken along lines 8-8 in FIG. 6.
Figure 9:
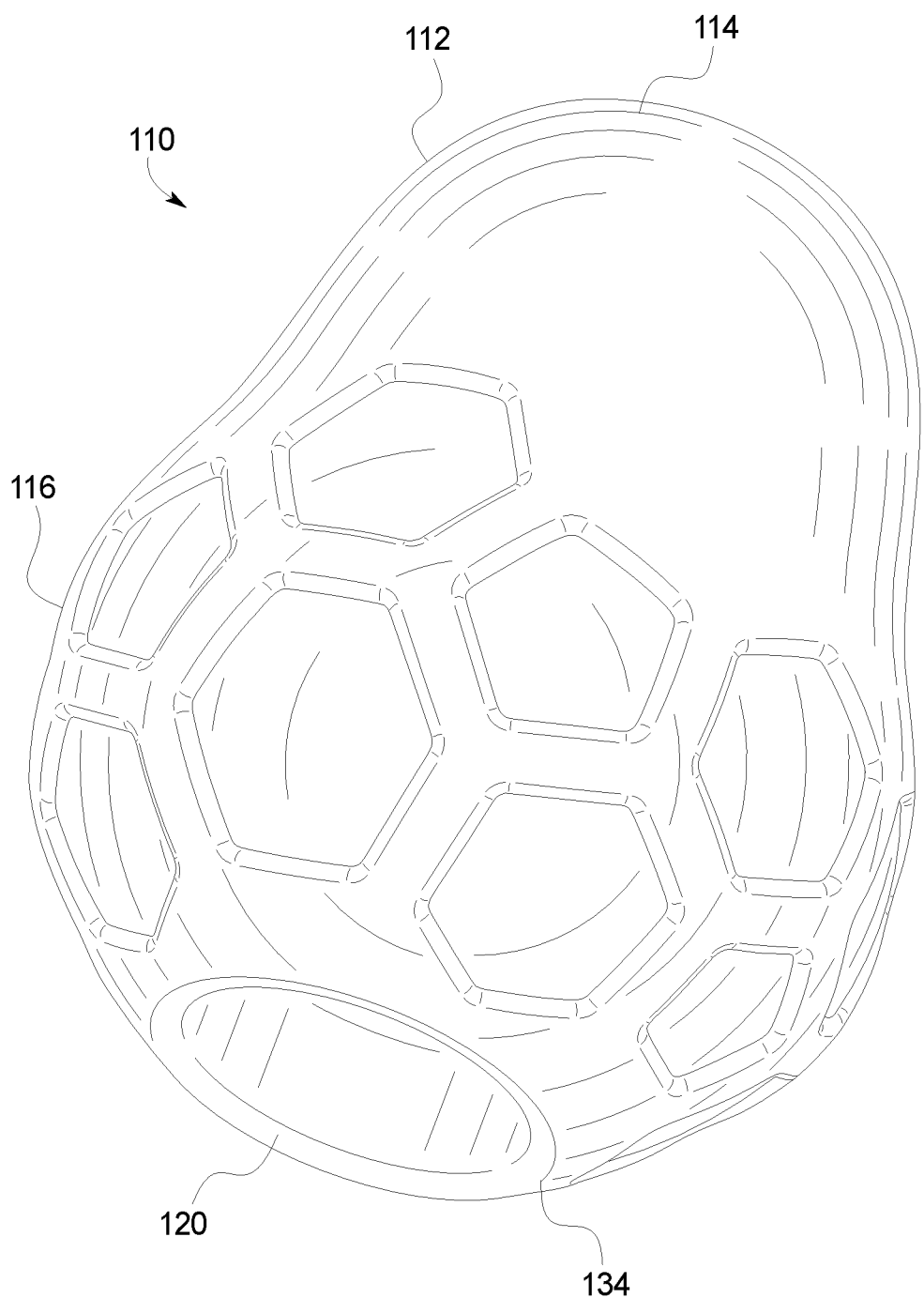
FIG. 9 is a bottom perspective view of a toy according to another embodiment of the present invention.
Figure 10:
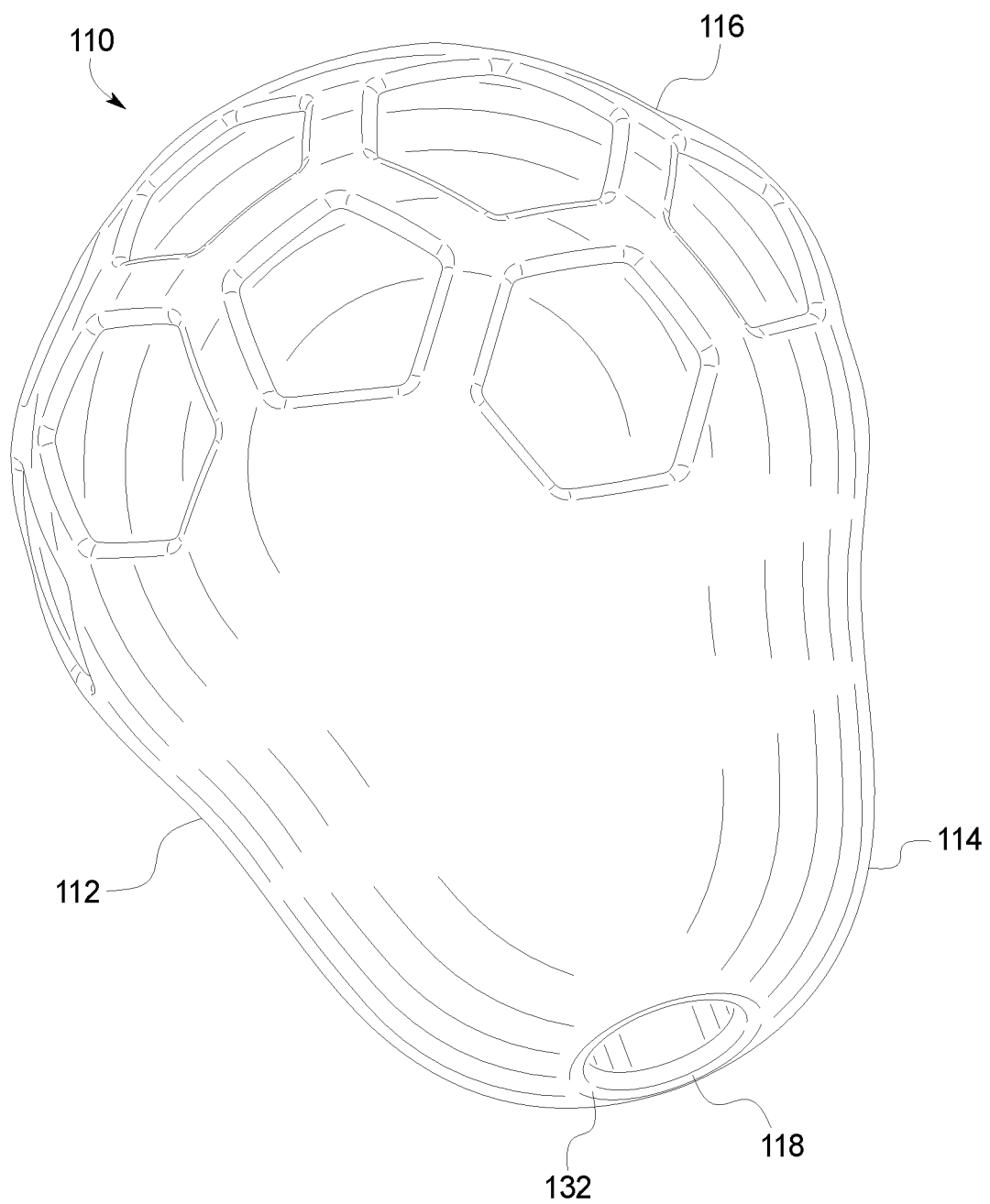
FIG. 10 is a top perspective view of the toy shown in FIG. 9.
Figure 11:
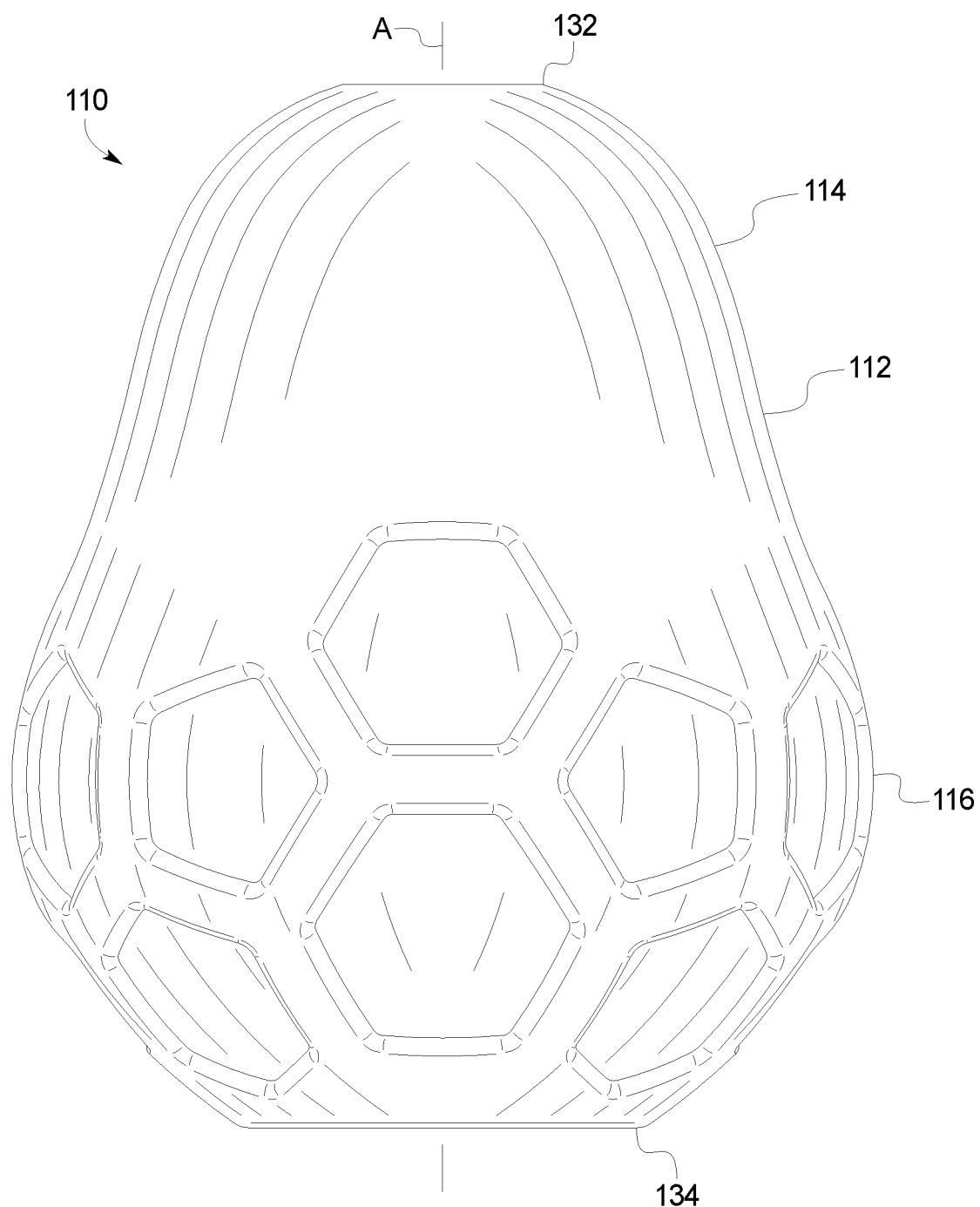
FIG. 11 is a side elevational view of the toy shown in FIG. 9.

As shown in FIGS. 6 and 7, the first separation arm 36 extends from the interior surface 26 in the second portion 16. The first separation arm 36 extends beyond the longitudinal axis A (i.e., the central axis) of the body 12. Moreover, as can be understood, the first separation arm 36 covers a majority of the second opening 20 when viewed along the longitudinal axis A from above. See for example, FIGS. 6 and 7. In this embodiment, the first separation arm 36 generally extends along a cord from a first portion 42 of the interior surface 28 to a second portion 44 to form a straight edge or end 40, such that the first separation arm 36 covers a majority of an area when viewed along the longitudinal axis A of the interior space I. Moreover, as can be understood, since the edge 40 extends along a cord, the edge 50 is generally unattached from the interior surface 28, forming a passage $P_1$ through the interior space I. The first separation arm 36 can have a curved or concaved configuration when viewed from the side, as shown in FIG. 6. Thus, the first separation arm 36 extends from the interior surface 28 in a downward direction then curves upward to the straight end 40.

In one embodiment, as shown in FIG. 6, the second separation 38 arm can be disposed closer to the first opening 18 than the first separation arm 36. However, it is noted that the second separation arm 38 can be disposed in any position or location desired and be in the same position (longitudinally) or a different position relative the either opening 18 or 20 from the first separation arm 36. The second separation arm 38 is generally configured in a similar manner to the first separation arm. That it, the second separation arm 38 generally extends along a cord from a first portion 46 of the interior surface 28 to a second portion 48 to form a straight edge or end 50, such that the second separation arm 38 covers a majority of an area when viewed along the longitudinal axis A of the interior space I. Moreover, as can be understood, since the edge 50 extends along a cord, the edge 50 is generally unattached from the interior surface 28, forming a passage $P_2$ through the interior space I. The second separation arm 38 can have a curved or concaved configuration when viewed from the side, as shown in FIG. 6. Thus, the second separation arm 38 extends from the interior surface 28 in a downward direction then curves upward to the straight end 50.

As shown in FIG. 6, the second separation arm 38 extends generally from the interior surface 28 at or near the portion (e.g., at a similar point as diameter $D_3$) having the narrowest internal diameter $D_6$ of the interior space I. Moreover, the second separation arm 38 is shorter than the first separation arm 36 and extends to about the longitudinal center (i.e., Axis A) of the body 12. The curvature of the second separation arm 38 can be less than the first separation arm 36. However, it is noted that the second separation arm 38 can have any suitable configuration.

In one embodiment, the second separation arm 38 is disposed opposite the first separation arm 36 in a radial direction—i.e., the second separation arm 38 is offset approximately 180 degrees from the first separation arm 36, such that the edge 40 of the first separation arm 36 is generally parallel to the edge 50 of the second separation arm 38. However, it is noted that the second separation arm 38 can be disposed in any radial position or location relative to the first separation arm 36. By positioning the first and second separation arms 36 and 38 as illustrated in the FIG. 6, the separation arms 36 and 38 are capable of forming a maze within the interior space. In other words, to pass from the first opening 18 to the second opening 20, foodstuff would have to traverse through the passage $P_2$ formed by the second separation arm 38 and then the passage $P_1$ formed by the first separation arm 36. Further, since the separation arms 36 and 38 can have a concave or curved configuration, the foodstuff can be trapped within the recesses formed by the arms 36 and 38, further inhibiting the foodstuff from traversing through the interior space I.

Although the ends 40 and 50 of separation arms 36 and 38 are illustrated as extending in a straight line, the ends 40 and 50 of separation arms 36 and 38 can extend in any configuration desirable, such that the ends 40 and 50 are curved in any direction. It is noted that the separation arms 36 and 38 can have any configuration, as long as it does not completely or substantially completely block the passage through the interior space I in a longitudinal direction. Further the separation arms 36 and 38 can be concave or convex along the longitudinal axis A.

By positioning the separation arms 36 and 38 in this manner, it can be more difficult for pet treats or other animal food stuff to exit either of the openings 18 or 20. In other words, the first and second separation arms 36 and 38 can be sized and configured to hinder food stuff from exiting one of (or both of) the first and second openings 36 and 38. This inhibiting or hindering the exiting of the treats or foodstuff can prolong the pet enjoyment of the pet toy 10. However, as noted above the separation arms 36 and 38 are configured to enable some sized food stuffs or treats to bypass the separation arms 36 and 38. Thus, treats or foodstuff of a predetermined size can be inserted into the first opening 18 and bypass the first and second arms 36 and 38 and exit the second opening 20.

Moreover, it is noted that in some embodiments the separation arms 36 and 38 can block a predetermined sized treat while enabling a smaller treat to bypass the separation arms 36 and 38. Further, since the body 12 is rubber, in some embodiments, the first and/or second openings can be stretched. Thus, a treat or food stuff can be inserted through the first or smaller opening 18 in such a manner that it is not capable of passing back through the opening without stretching the opening 18. However, since the second opening 20 has a larger diameter $D_5$, the treat can travel through the interior space is past the separation arms 36 and 38 and through the second opening 20.

As can be understood, the separation arms 36 and 38 can be molded in the same molding process as the body 12, or the separation arms 36 and 38 can be attached to the interior surface 28 of the body 12 in any suitable manner. Preferably, the separation arms 36 and 38 are formed from rubber and sized and configured to be flexible. Thus, in one embodiment, the separation arms 36 and 38 are capable of moving so as to be pressed against the interior surface I. In such an embodiment, the separation arms 36 and 38 can be attached to the interior surface 28 along a smaller radial arc (i.e., less than 180 degrees) such that the arm can be easily flexed in the longitudinal direction. This flexibility enables the arms 36 and 38 to be moved for easier loaded of treats or animal foodstuffs. However, is it noted that the separation arms 36 and 38 can be rigid, or portions can be flexible while other portions are rigid, or the arms 36 and 38 can be semi-rigid or any combination thereof.

FIGS. 11-15 illustrate a second embodiment of a pet toy 110 the present invention. This embodiment is similar to the above embodiment, except the external surface or shape (and thus the interior space) is different and there is only one separation arm. Thus, only the differences will be described herein. In this embodiment, the body 112 includes a top portion 114 and a bottom portion 116. The top portion 114 has a first diameter $D_7$ and the bottom portion 116 has a second diameter $D_8$, the second diameter $D_8$ being larger than the first diameter $D_7$.

Figure 12:
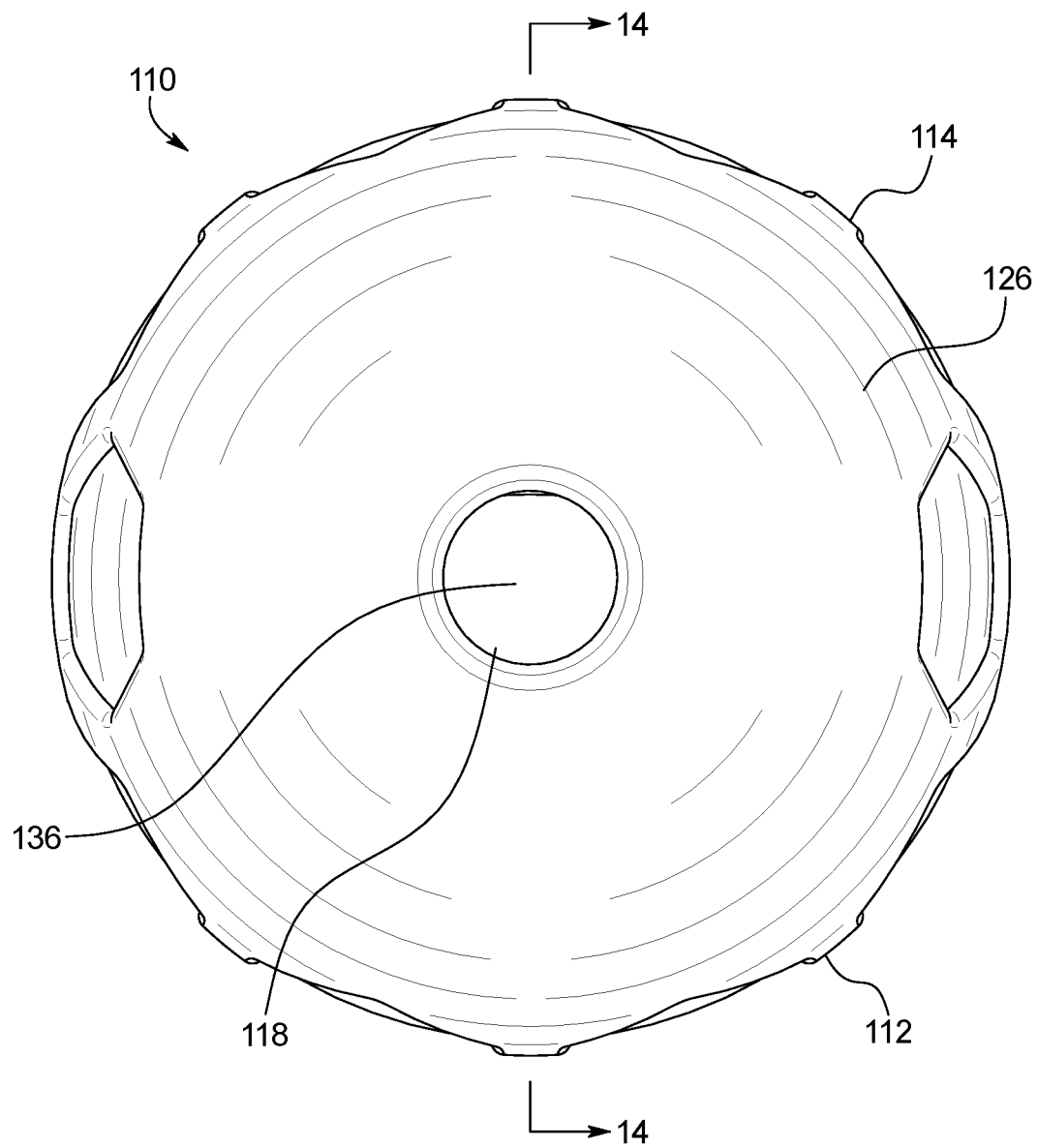
FIG. 12 is a top plan view of the toy shown in FIG. 9.
Figure 13:
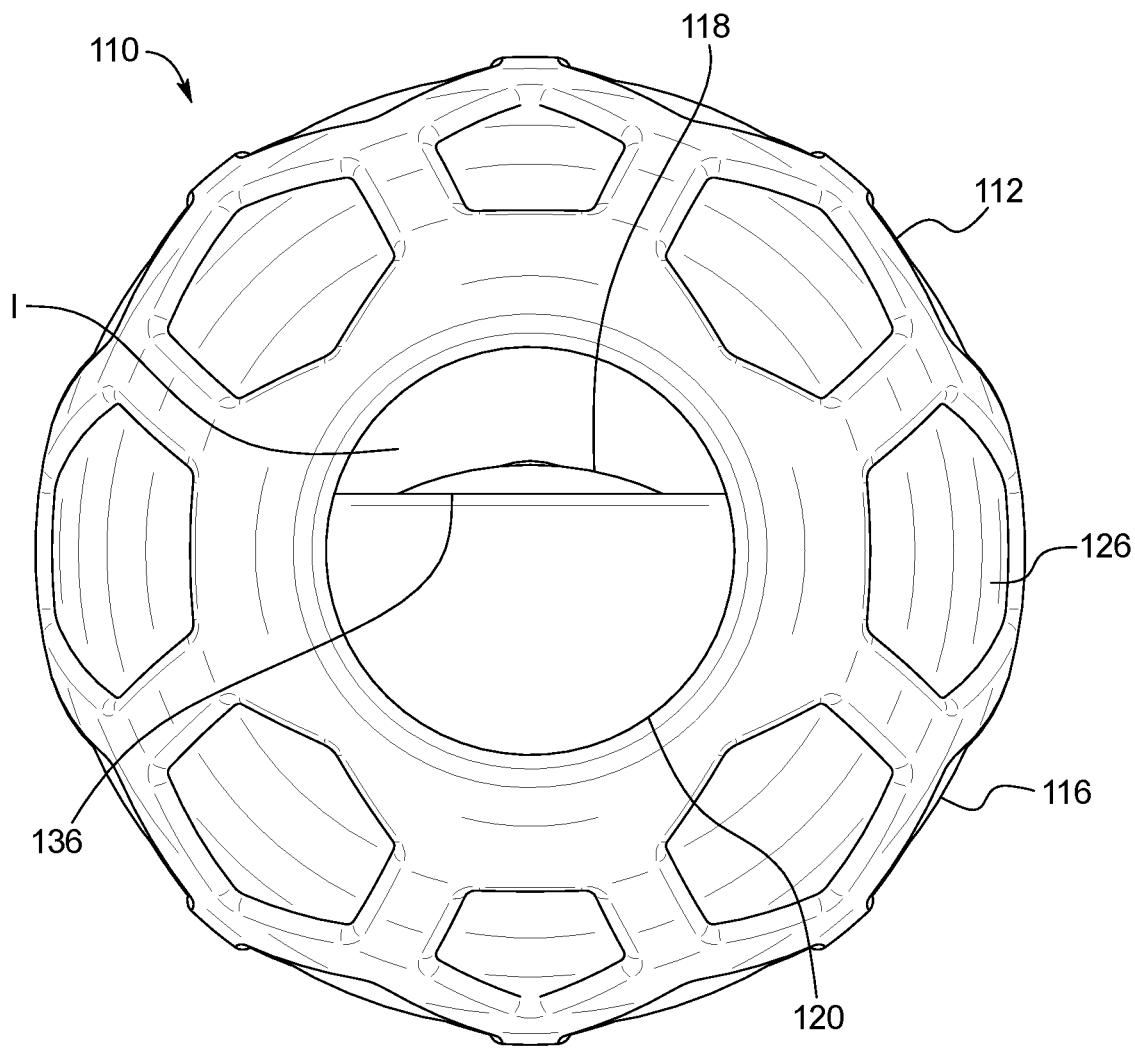
FIG. 13 is a bottom plan view of the toy shown in FIG. 9.
Figure 14:
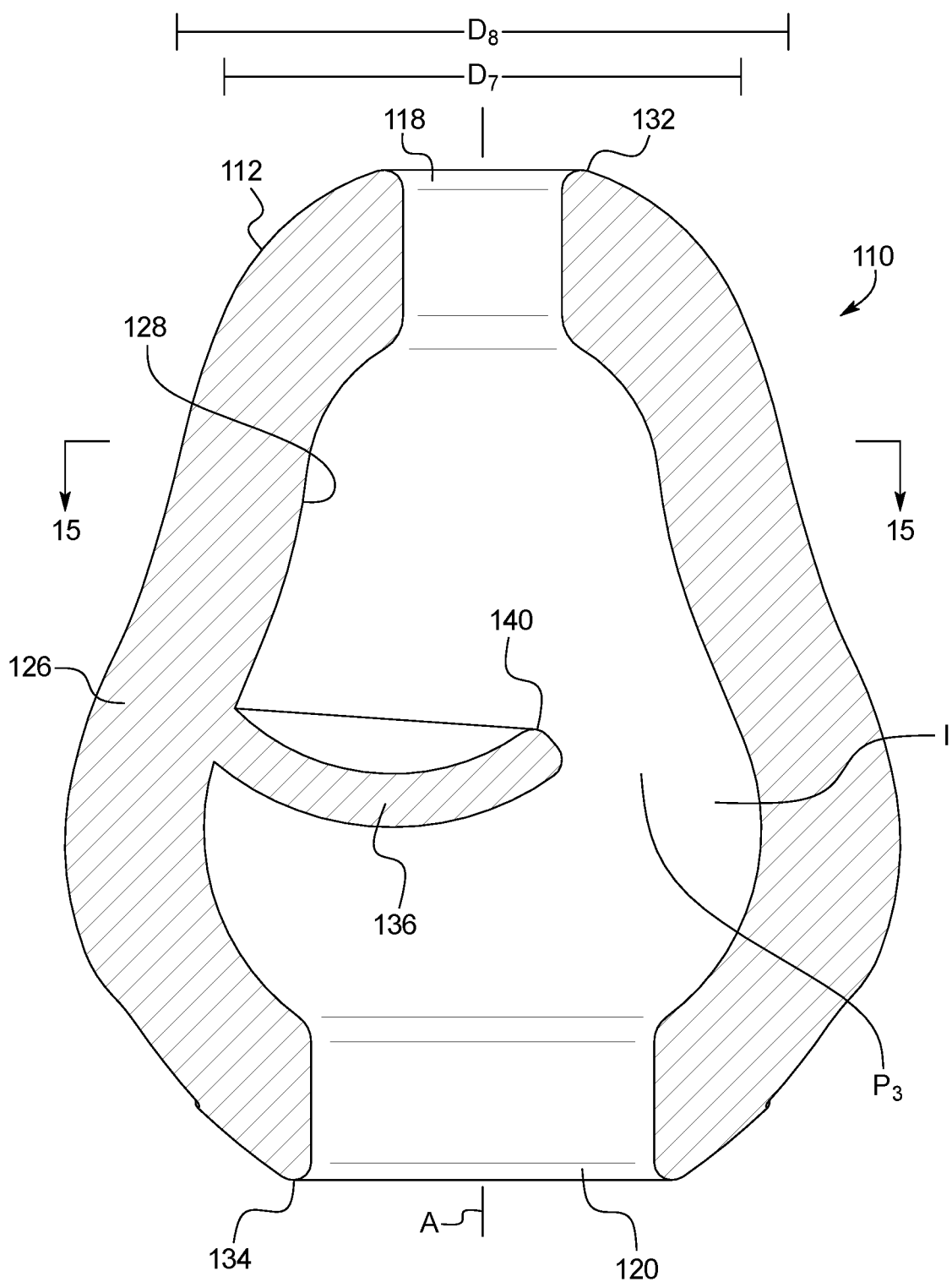
FIG. 14 is a sectional view taken along lines 14-14 in FIG. 12.

The top portion 114 has an upper surface 132 with an opening 118, and as shown in FIGS. 12 and 14, has a generally circular configuration when viewed from above. The outer surface 126 of the body 112 curves downwardly and outwardly to form a maximum diameter portion (e.g., diameter $D_7$) for the top portion 114. The outer surface 126 then curves downwardly and farther outwardly to form a maximum diameter portion (e.g., diameter $D_8$) for the bottom portion 116 and then curves downwardly and inwardly to the bottom surface 134.

Figure 15:
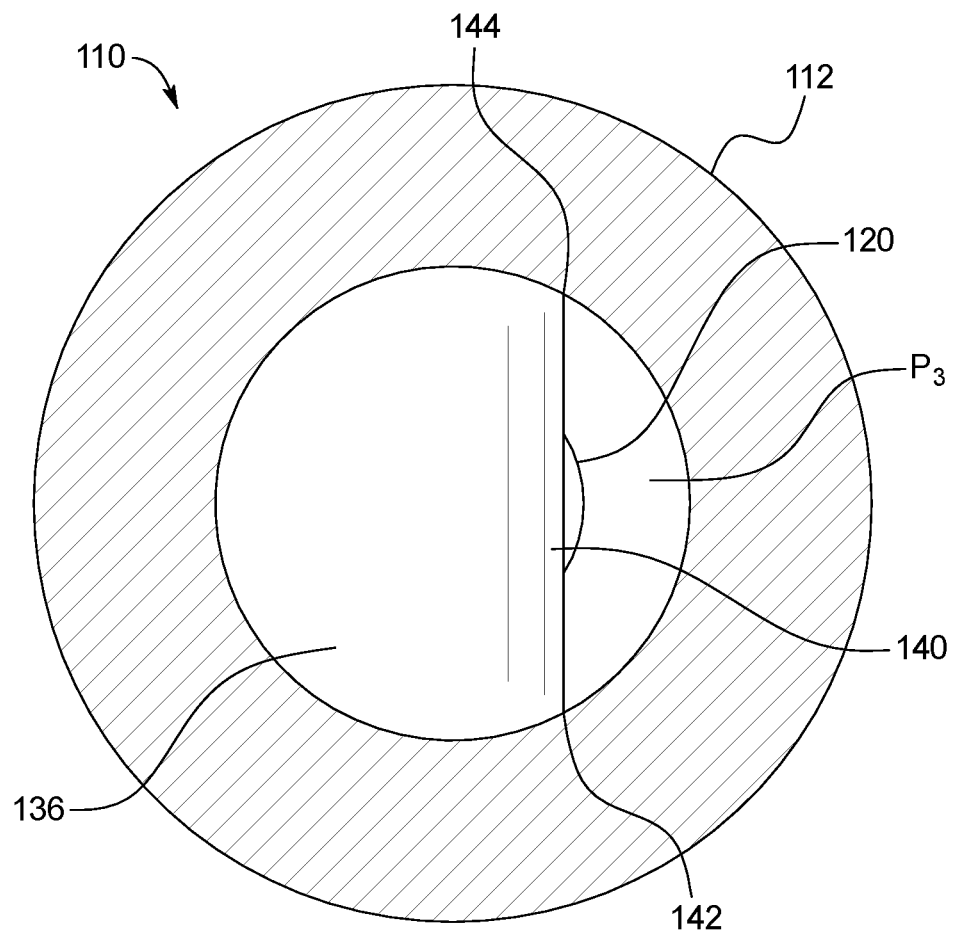
FIG. 15 is a sectional taken along lines 15-15 in FIG. 14.

As shown in FIGS. 14 and 15, a separation arm 136 extends from the interior surface 128 in the lower portion 116. The first separation arm 136 extends beyond the longitudinal axis A (i.e., the central axis) of the body a12. Moreover, as can be understood, the separation arm 136 covers a majority of the second opening 120 when viewed along the longitudinal axis A from above. See for example, FIG. 15. In this embodiment, the separation arm 136 generally extends along a cord from a first portion 142 of the interior surface 128 to a second portion 144 to form a straight edge or end 140, such that the first separation arm 136 covers a majority of an area when viewed along the longitudinal axis A of the interior space I. Moreover, as can be understood, since the edge 140 extends along a cord, the edge 140 is generally unattached from the interior surface 128, forming a passage $P_3$ through the interior space I. The separation arm 136 has a curved or concaved configuration when viewed from the side, as shown in FIG. 14. Thus, the separation arm 136 extends from the interior surface I in a downward direction then curves upward to the straight end 140.

Although the end 140 of the separation arm 136 is illustrated as extending in a straight line, the end 140 of the separation arm 136 can extend in any configuration desirable, such that the end 140 is curved in any direction. It is noted that the separation arm 136 can have any configuration, as long as it does not completely or substantially completely block the passage through the interior space I in a longitudinal direction. Further the separation arm 136 can be concave or convex along the longitudinal direction.

By positioning the separation arm 136 in this manner, it can be more difficult for pet treats or other animal food stuff to exit either of the openings 118 or 120. In other words, the separation arm 136 can be sized and configured to hinder food stuff from exiting one of (or both of) the first and second openings 118 and 120. This inhibiting or hindering the exiting of the treats or foodstuff can prolong the pet enjoyment of the pet toy 110. However, as noted above the separation arm 136 is configured to enable some sized food stuffs or treats to bypass the separation arm 136. Thus, treats or foodstuff of a predetermined size can be inserted into the first opening 118 and bypass the arm 136 and exit the second opening 120.

Moreover, it is noted that in some embodiments the separation arm 136 can block a predetermined sized treat while enabling a smaller treat to bypass the separation arm 136. Further, since the body 112 is rubber, in some embodiments, the first and/or second openings 118 and 120 can be stretched. Thus, a treat or food stuff can be inserted through the first or smaller opening 118 in such a manner that it is not capable of passing back through the opening 118 without stretching the opening 118. However, since the second opening 120 has a larger diameter $D_9$, the treat can travel through the interior space I past the separation arm 136 and through the second opening 120.

As can be understood, the separation arm 136 can be molded in the same molding process as the body 112, or the separation arm 136 can be attached to the interior surface 128 of the body 112 in any suitable manner. Preferably, the separation arm 136 is formed from rubber and sized and configured to be flexible. Thus, in one embodiment, the separation arm 136 is capable of moving so as to be pressed against the interior surface I. In such an embodiment, the separation arm 136 can be attached to the interior surface 128 along a smaller radial arc (i.e., less than 180 degrees) such that the arm 136 can be easily flexed in the longitudinal direction. This flexibility enables the arm 136 to be moved for easier loaded of treats or animal foodstuffs. However, is it noted that the separation arm 136 can be rigid, or portions can be flexible while other portions are rigid, or the arms can be semi-rigid or any combination thereof.

As can be understood, the present invention is an improvement of existing pet toy 10s and will enable prolonged enjoyment by the pet by inhibiting or preventing the treat or foodstuff from exiting the openings in the toy.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section" or "portion" when used in the singular can have the dual meaning of a single part or a plurality of parts.

The term "configured" as used herein to describe a component, section or part of a device includes hardware and/or software that is constructed and/or programmed to carry out the desired function.

The terms of degree such as "substantially", "about", "generally" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A pet toy comprising:
a hollow body defining an interior space with an interior surface and including
a first portion having a first diameter, a second portion having a second diameter, a first opening in the first portion,
a second opening in the second portion, the second opening having a maximum diameter that is larger than a maximum diameter of the first opening,
a first separation arm having a first maximum length extending from a first side of the interior surface in the interior space and being disposed between the first and second openings, the first separation arm being curved in a direction towards the second opening, and
a second separation arm having a second maximum length extending from a second side of the interior surface in the interior space and being disposed between the first and second openings, the second separation arm being curved in a direction towards the second opening,
the first and second sides of the interior space being opposite sides of the interior space of the hollow body, and the first and second maximum lengths being different such that the first and second separation arms are staggered with respect to each other along a longitudinal axis of the hollow body.

2. The pet toy of claim 1, wherein
the first opening is disposed in an upper surface of the first portion and the second opening is disposed in the lower surface of the second portion.

3. The pet toy of claim 1, wherein
the center of the first and second openings are disposed along the longitudinal axis of the hollow body.

4. The pet toy of claim 1, wherein
the second diameter is larger than the first diameter.

5. The pet toy of claim 1, wherein
the second separation arm is disposed closer to the first opening than the separation arm.

6. The pet toy of claim 1, wherein
the first separation arm and the second separation arm define a pathway for foodstuffs to travel between the first and second openings within the interior space, the pathway being unaligned with respect to the first and second openings.

7. The pet toy of claim 1, wherein
the first and second separations arm are flexible.

8. A pet toy comprising:
a hollow body defining an interior space with an interior surface and including
a first portion having a first diameter, a second portion having a second diameter that is larger than the first diameter, a first opening in the first portion, a second opening in the second portion, a first separation arm extending from the interior surface in the interior space and being disposed between the first and second openings, and a second separation arm extending from the interior surface in the interior space and being disposed between the first and second openings, the first and second separation arms forming a pathway for foodstuffs to travel between the first and second openings, the pathway being unaligned with respect to the first and second openings, the first and second separation arms having different maximum lengths extending from opposite sides of the interior space of the hollow body such that the first and second separation arms are staggered with respect to each other along a longitudinal axis of the hollow body.

9. The pet toy of claim 8, wherein
the center of the first and second openings are disposed along the longitudinal axis of the hollow body.

10. The pet toy of claim 8, wherein
the second separation arm is disposed closer to the first opening than the first separation arm.

11. The pet toy of claim 8, wherein the second opening has a diameter that is larger than the first opening.

12. The pet toy of claim 8, wherein the first and second separation arms are flexible.

13. The pet toy of claim 6, wherein the pathway for foodstuffs being offset with respect to the longitudinal axis of the hollow body.

14. The pet toy of claim 9, wherein the pathway for foodstuffs being offset with respect to the longitudinal axis of the hollow body.

* * * * *